Inventor
William S. Pearson
by The Firm of Charles W. Hill
Attys

Dec. 7, 1954
W. S. PEARSON
2,696,446
METHOD OF PREVENTING HANDLING ROLL
DAMAGE TO FRESHLY GALVANIZED PIPE
Filed Oct. 5, 1950
2 Sheets-Sheet 2
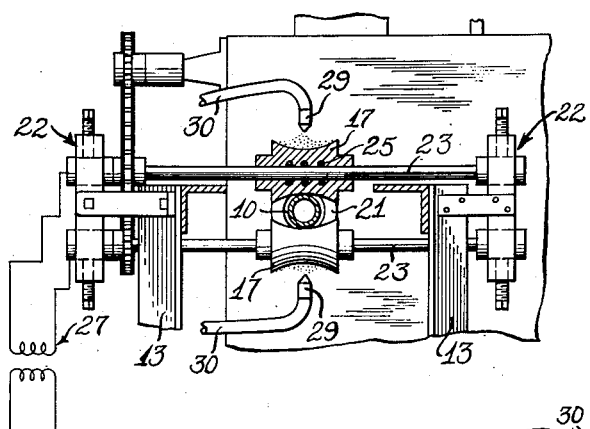
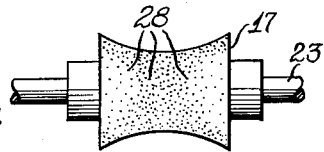
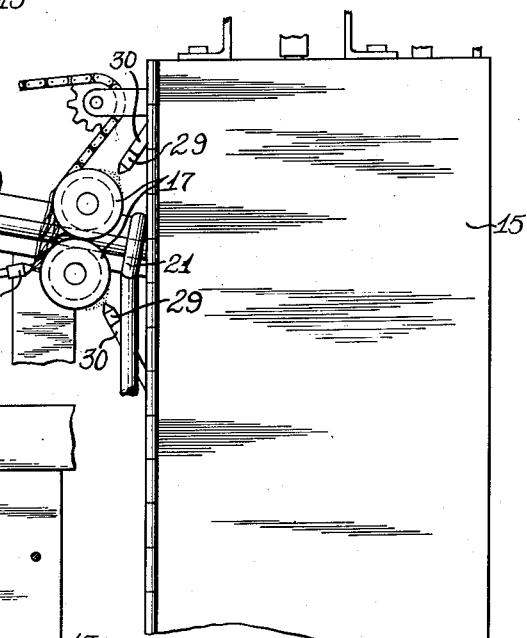
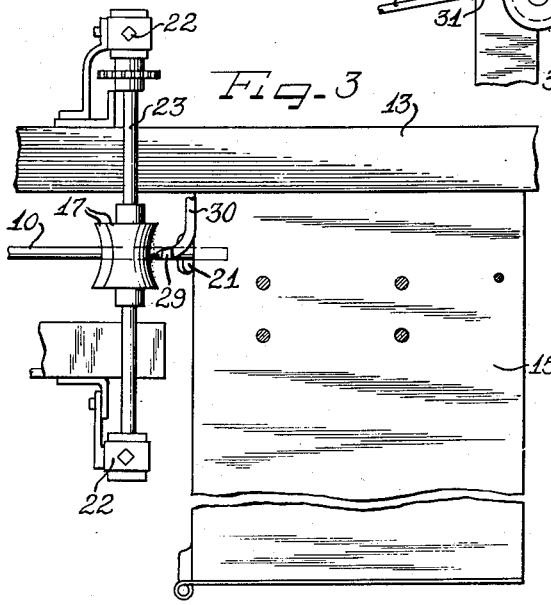
Inventor
William S. Pearson
Attys

United States Patent Office 2,696,446
Patented Dec. 7, 1954

2,696,446

METHOD OF PREVENTING HANDLING ROLL DAMAGE TO FRESHLY GALVANIZED PIPE

William S. Pearson, Baltimore, Md., assignor to Clifton Conduit Company, Inc., Baltimore, Md., a corporation of Maryland Application October 5, 1950, Serial No. 188,623

9 Claims. (Cl. 117—46)

The present invention relates to improvements in the handling of freshly galvanized pipe and more particularly concerns the prevention of damage to the fresh, still fluent or soft external coating of galvanizing zinc on the pipe while the freshly galvanized pipe is being handled as an incident to processing the same immediately following removal of the pipe from the zinc pot.

One of the problems encountered in handling freshly galvanized pipe by means of roller conveyors or impelling devices immediately following removal of the pipe from the zinc pot and while the external zinc coating is still in a fluent or soft condition has been, first, prevention of damage to the fresh coating caused by the necessary engagement of the pipe and thus the fresh zinc coating, and secondly, the prevention of accumulation of or transfer of zinc to and fouling of the handling equipment with fresh zinc during service.

Accordingly, it is an important object of the present invention to provide a novel method of substantially preventing the transference of fresh zinc coating from hot, freshly galvanized pipe to handling apparatus which must come into direct contact with the freshly galvanized pipe during handling of the pipe following removal thereof from the zinc pot.

More specifically, it is an object of the invention to provide an improved method of treating handling rolls against not only marring the fresh zinc coating on freshly galvanized pipe handled thereby but also against the transference of the fresh zinc coating to the handling rolls.

Another object of the invention is to provide improved means for handling freshly galvanized pipe without damaging the fresh zinc coating thereon.

A further object of the invention is to provide a novel coating for the pipe-engaging surfaces of handling rolls for freshly galvanized pipe.

Other objects, features and advantages of the present invention will be readily apparent from the following detailed description of a preferred embodiment thereof taken in conjunction with the accompanying drawings in which:

Figure 2 is an enlarged fragmentary elevational view, partially in section taken substantially on the line II—II of Fig. 1;

Figure 3 is an enlarged fragmental plan view, partially in section, taken substantially on the line III—III of Fig. 1;

Figure 4 is an elevational view on an enlarged scale of one of the forming rolls showing the improved spelter-repelling coating thereon; and Figure 5 is a fragmentary side elevational view of the apparatus for removing excess galvanizing material from freshly galvanized pipe and showing a modified arrangement for practicing the invention.

Figure 1:
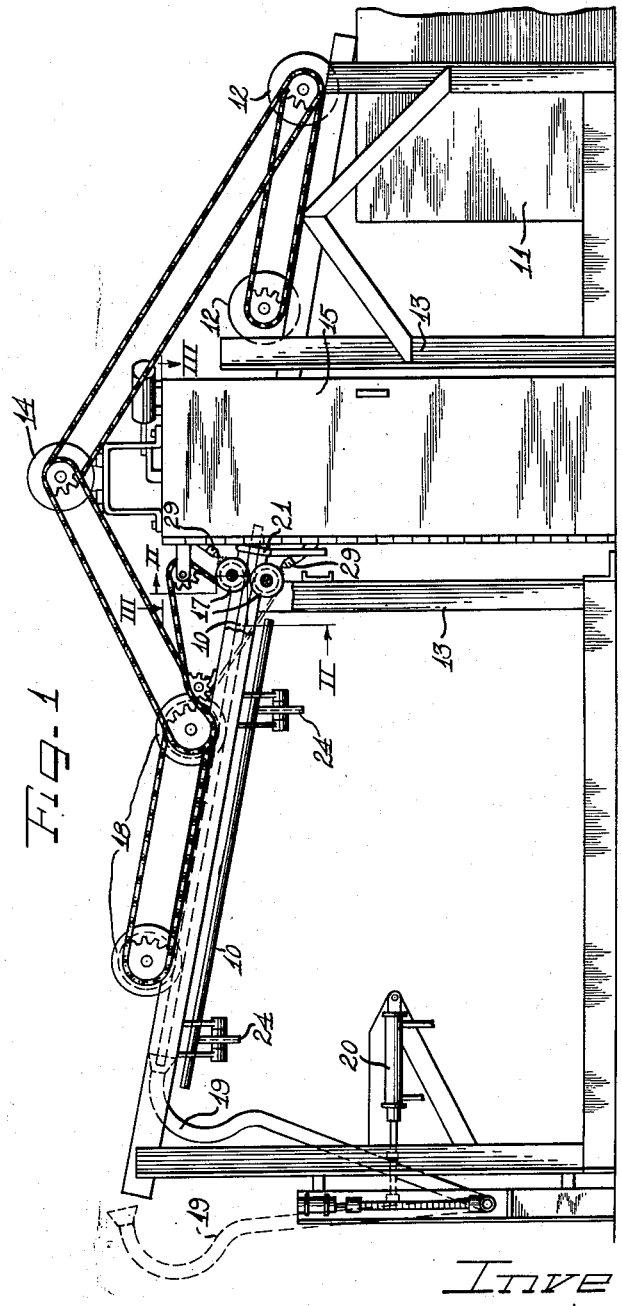
Figure 1 is a more or less schematic side elevational view of apparatus for removing excess galvanizing material from freshly galvanized pipe and utilizing the present invention.

In the preferred form of apparatus disclosed, and with which the present invention is utilized, a succession of freshly galvanized lengths of conduit or pipe 10 are removed from a zinc pot 11 and delivered to successively operable overhead magnetic conveyor rolls 12 carried by a framework 13 and actuated by a suitable chain drive motivated by a motor 14. Support for the motor is provided by the upper portion of a spatter chamber 15 through which the freshly galvanized pipe sections are caused to travel by the conveyor rolls 12, the side walls of the chamber having appropriate openings (not shown) through which the pipe sections advance. At the side of the spatter chamber 15 opposite to the conveyor rolls 12, each of the pipe sections as it emerges from the spatter chamber 15 is engaged by a pair of pinch rolls 17 supported by the framework 13 and cooperative to engage the conduit section therebetween and advance the same to a pair of overhead magnetic conveyor rolls 18. The pinch rolls 17 and the conveyor rolls 18 are driven in suitable manner as by means of a chain drive also motivated by the motor 14. The conveyor rolls 18 operate by magnetic attraction of the pipe and carry the same forward until the forward end of the pipe engages within the bell mouth of a gooseneck blow pipe 19 by which internal swabbing fluid such as superheated steam is introduced to the interior of the pipe and driven therethrough to swab excess galvanizing material from the interior of the pipe and cause the same to be ejected into the spatter chamber 15. Following the internal swabbing action, the blow pipe 19 is retracted from its swabbing position which is shown in full outline in Fig. 1 to the dash outline position by means of a cylinder and piston operator 20. External swabbing of excess galvanizing material from the conduit sections is effected by a ring-type external superheated steam swab 21 located between the pinch rolls 17 and the exit opening from the spatter chamber 15 to direct swabbed material into the spatter chamber.

The pinch rolls 17, of course, operate by engaging the freshly galvanized conduit therebetween and by opposing pressure effecting sufficient grip to impel the conduit forwardly in the rotation of the rolls. The gripping pressure can be adjusted through the medium of adjustable journal structure 22 (Fig. 2) carrying respective shafts 23 on which the pinch rolls are mounted.

After the freshly galvanized conduit has been swabbed free of excess galvanizing material, it is expelled from the pinch rolls 17 and drops down onto a conveyor 24 to be carried on to a stacker or other point. Usually by the time the conduit drops onto the conveyor the galvanizing material on the exterior thereof has set so that likelihood of damage to the coating is slight.

However, it will be observed that in view of the early stage in the handling of the freshly galvanized pipe 10 during which the pinch rolls 17 engage the same, the successive sections of pipe will still be at a heat that maintains the galvanizing material on the exterior of the pipe sections fairly fluent. Therefore, means are provided for heating the rolls 17 so as to avoid chilling the external surface areas engaged by the rolls. In one form such means comprise electrical heating elements 25 within the rolls supplied with electrical energy through an appropriate electrical circuit 27 (Fig. 2). While this heating of the rolls avoids chilling and grooving of the fluid zinc coating on the pipe sections, it has been found to have the disadvantage of establishing, if not a galvanic action on the surface of the rolls, at least such a favorable environment for attraction of the galvanizing zinc that an undesirable proportion of the zinc has displaced from the engaged areas of the freshly galvanized pipe or conduit sections onto the surfaces of the pinch rolls with the result that eventually the rolls become so thickly coated that the pipe-engaging surfaces thereof no longer operate efficiently and at frequent intervals surplus zinc is transferred from the pinch rolls onto areas of the pipe being handled thereby, so that the uniformity of external coating of the pipe sections is adversely affected.

According to the present invention, however, all of the advantages derived from heating of the rolls 17 are retained and the disadvantages are eliminated. This is accomplished simply and quite efficiently and economically by providing on the pipe-engaging surfaces of the pinch rolls 17 a thin, substantially uniform layer of small particles of a zinc repellent material. A very effective material for this purpose has been found to be carbon in the form of carbon black. This material is applied to the surfaces of the rolls in minute specks or particles 28 as shown in exaggerated form for purpose of illustration in Fig. 4, in as uniform as practicable distribution over the pipe-engaging surfaces of the rolls, but more particularly throughout the deepest portion of the dished or concave contour of the rolls where the pipe sections are primarily engaged. As a result, the surfaces of the rolls remain free from the molten zinc irrespective of the heat of the rolls, and, by the same token, the zinc coating on the surfaces of the successive pipe sections remains on the pipe sections and the surfaces of the pipe sections remain free from roll contact grooves or aberrations. Some of the carbon particles, of course, will transfer to the surfaces of the pipe sections, but since there is mutual repulsion between the carbon particles and the molten zinc, the carbon particles remain on the exterior of the coating and subsequently drop away or are rubbed off in handling and therefore leave the zinc coating unaffected.

An efficient method of applying the carbon particles is through the medium of one or more nozzles 29, shown herein as comprising one of the nozzles 29 directed toward each of the pinch rolls 17 in an efficient spaced relation thereto. From the nozzles 29 paraffin oil is sprayed onto the pipe-engaging surfaces of the rolls in an atomized form so that droplets of the paraffin oil impinge the roll surfaces and cling thereto and by the heat of the rolls are carbonized. The paraffin oil is supplied to the nozzles 29 from any suitable source under appropriate atomizing pressure through respective supply conduits 30.

Where for some reason the pinch rolls 17 are not electrically heated, direct flame heating thereof may be effected substantially as shown in Fig. 5. For this purpose a burner nozzle 31 may be positioned forwardly of the set of pinch rolls 17 at a low enough elevation to direct a flame onto both of the rolls during operation. The nozzle 31 is supplied with fluid fuel through a supply duct or conduit 32 from any appropriate source. For example, fuel oil has been found economical and efficient for this purpose. Since in order to provide efficient heating, the flame produced by the nozzle 31 must be as smokeless as practicable, insufficient carbon black is produced to supply the conveyor or pinch rolls with carbon particles and therefore the spray nozzles 29 are provided similarly as described hereinbefore to supply an atomized spray of paraffin oil in the form of droplets onto the surfaces of the rolls where the ambient heat of the rolls will carbonize the droplets into carbon particles. It will be observed that the flame from the nozzle 31 is applied to the rolls on the opposite sides of the rolls from the impingement by the paraffin oil spray so that the paraffin oil is not ignited or burned but directly impinges the rolls and is then carbonized by the heat of the rolls and becomes effective as a carbon particle covering, coating or layer on the rolls just before the freshly carbonized surfaces of the rolls engage the freshly galvanized section of pipe to be handled thereby. Then any carbon that is burned off of the rolls by the flame from the nozzle 31, is replaced in the continuing operative turning of the rolls toward reengagement with the pipe sections.

It will be understood that modifications and variations may be effected without departing from the scope of the novel concepts of the present invention.

I claim as my invention:

1. In a method of galvanizing pipe wherein pipe having a zinc coating in a fluent condition thereon is handled by a conveyor roll, the improvement which comprises, spraying continuous surface portions of said roll with a carbonizable fluid material and heating the roll sufficiently to carbonize the said material prior to engaging said pipe by said continuous surface portions of said roll successively.

2. In a method of galvanizing pipe wherein pipe having a zinc coating in a fluent condition thereon is handled by a conveyor roll, the improvement which comprises, spraying continuous surface portions of said roll with a carbonizable fluid material and maintaining said roll at a sufficient temperature to carbonize said material prior to engagement of said pipe and said continuous surface portions of said roll.

3. In a method of galvanizing pipe wherein pipe having a zinc coating in a fluent condition thereon is handled by a conveyor roll, the improvement which comprises, spraying continuous surface portions of said roll with a carbonizable oil, and heating the roll sufficiently to carbonize said oil prior to engaging said pipe by said continuous surface portions of said roll.

4. In a method of galvanizing pipe wherein pipe having a zinc coating in a fluent condition thereon is handled by a conveyor roll, the improvement which comprises, spraying continuous surface portions of said roll with paraffin oil, and heating the roll sufficiently to carbonize said paraffin oil prior to engaging said pipe by said continuous surface portions of said roll.

5. In a method of galvanizing pipe wherein pipe having a zinc coating in a fluent condition thereon is handled by a conveyor roll, the improvement which comprises, spraying continuous surface portions of said roll with a carbonizable fluid material and directing a heating flame towards said roll to heat said roll sufficiently to carbonize said material prior to engaging said pipe by said continuous surface portions of said roll.

6. In a method of galvanizing pipe wherein pipe having a zinc coating in a fluent condition thereon is handled by a roll, the improvement which comprises, spraying continuous surface portions of said roll with a carbonizable fluid material, and continuously electrically heating the roll sufficiently to carbonize said material prior to engaging said pipe by said continuous surface portions of said roll.

7. In a method of galvanizing pipe wherein pipe having a zinc coating in a fluent condition thereon is handled by a roll, the improvement which comprises, directing droplets of a carbonizable fluid material against continuous surface portions of said roll, and maintaining the roll at a temperature sufficiently high to carbonize said material prior to engaging said pipe by said continuous surface portions of said roll.

8. In a method of galvanizing pipe wherein pipe having a zinc coating in a fluent condition thereon is handled by a conveyor roll, the improvement which comprises, spraying continuous surface portions of said roll with paraffin oil, and directing a heating flame against said roll to heat said roll to a temperature sufficiently high to carbonize said oil prior to engaging said pipe by said continuous surface portions of said roll.

9. In a method of galvanizing pipe wherein pipe having a zinc coating in a fluent condition thereon is handled by a roll, the improvement which comprises, spraying continuous surface portions of said roll with paraffin oil, and electrically heating said roll to a temperature sufficiently high to carbonize said oil prior to engaging said pipe by said continuous surface portions of said roll.

References Cited in the file of this patent

UNITED STATES PATENTS

| Number | Name | Date |
|---|---|---|
| 669,765 | Reichhelm | Mar. 12, 1901 |
| 2,239,414 | Eddison | Apr. 22, 1941 |
| 2,424,808 | Eckman | July 29, 1947 |